United States Patent [19]

Suzuki

[11] Patent Number: 5,668,214
[45] Date of Patent: Sep. 16, 1997

[54] POLYARYLENE SULFIDE RESIN COMPOSITION

[75] Inventor: Yasuhiro Suzuki, Iwaki, Japan

[73] Assignee: Kureha Kagaku Kogyo Kabushiki Kaisha, Tokyo, Japan

[21] Appl. No.: 643,432

[22] Filed: May 8, 1996

[30] Foreign Application Priority Data

May 23, 1995 [JP] Japan .................. 7-146870
Mar. 27, 1996 [JP] Japan .................. 8-097555

[51] Int. Cl.$^6$ .................................. C08G 63/48
[52] U.S. Cl. .................. 525/64; 525/65; 525/68; 525/537
[58] Field of Search ............... 525/63, 65, 537, 525/68, 64

[56] References Cited

U.S. PATENT DOCUMENTS

| | | | |
|---|---|---|---|
| 5,204,405 | 4/1993 | Orikasa | 525/64 |
| 5,281,665 | 1/1994 | Fukui et al. | 525/84 |
| 5,288,817 | 2/1994 | Yamamoto et al. | 525/63 |
| 5,438,098 | 8/1995 | Orikasa | 525/64 |

FOREIGN PATENT DOCUMENTS

| | | |
|---|---|---|
| 0327300 | 8/1989 | European Pat. Off. . |
| 0406553 | 1/1991 | European Pat. Off. . |
| 0506006 | 9/1992 | European Pat. Off. . |
| 0661348 | 7/1995 | European Pat. Off. . |

*Primary Examiner*—Mark D. Sweet
*Attorney, Agent, or Firm*—Wenderoth, Lind & Ponack

[57] ABSTRACT

A polyarylene sulfide resin composition having improved toughness and impact resistance is formed by 100 wt. parts of polyarylene sulfide and 0.5-50 wt. parts of a graft copolymer. The graft copolymer includes an olefin copolymer segment comprising α-olefin units and α,β-unsaturated acid glycidyl ester units, and a grafting polymer segment comprising α,β-unsaturated acid glycidyl ester units and chemically bonded to the olefin copolymer segment. The α-olefin is preferably ethylene. The α,β-unsaturated acid glycidyl ester is preferably glycidyl acrylate or glycidyl methacrylate. The grafting polymer segment is preferably in the form of a copolymer of an α,β-unsaturated acid glycidyl ester and a monoethylenically unsaturated monomer.

14 Claims, No Drawings

POLYARYLENE SULFIDE RESIN COMPOSITION

FIELD OF THE INVENTION AND RELATED ART

The present invention relates to a polyarylene sulfide resin composition, particularly a polyarylene sulfide resin composition having improved impact resistance and also excellent heat resistance and molding characteristics.

In recent years, there has been an increasing demand for thermoplastic resins which have high heat resistance and chemical resistance and also non-flammability as materials for electrical and electronic components, automotive components, chemical apparatus components, etc. Polyarylene sulfide represented by polyphenylene sulfide is one of such resins complying with the demand and also is known as a resin exhibiting reasonable cost performances, so that there has been an increasing demand therefor. However, polyarylene sulfide has inherent defects that it is not sufficient in toughness but is rather fragile, and has insufficiencies in mechanical properties as represented by impact resistance.

As technical measures for solving the problem, the following are known.

(1) To incorporate reinforcing fiber materials, such as glass fiber and carbon fiber.

(2) To incorporate another polymer.

However, these measures respectively involve a difficulty and have not provided a sufficient solution to the above problem. More specifically, the reinforcing fiber incorporation (1) provides remarkable improvements in strength, heat resistance and size stability to allow use as an engineering plastic, but the resultant product still show less elongation, inferior toughness and lower impact strength than other engineering plastics, such as polyacetal, polybutylene terephthalate, polysulfone, and polyether sulfone, so that the usage thereof has been limited.

On the other hand, many proposals have been made regarding the incorporation of another polymer (2), but most of them result in a lowering in heat distortion temperature and few have provided a sufficient effect. Among such proposals, Japanese Laid-Open Patent Application (JP-A) 1-198664 has proposed a graft copolymer including an olefin copolymer including α-olefin (recurring) units and α,β-unsaturated acid glycidyl ester (recurring) units, and a polymer chemically bonded to the olefin copolymer in the form of branches or crosslinkages, the polymer being composed of (recurring) units each represented by the formula below:

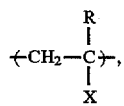

wherein R denotes a hydrogen atom or a lower alkyl group; and X denotes at least one group selected from —COOCH$_3$, —COOC$_2$H$_5$, —COOC$_4$H$_9$, —COOCH$_2$CH(C$_2$H$_5$)C$_4$H$_9$, phenyl, and —CN. The graft copolymer shows a good mutual solubility with polyarylene sulfide and, when blended with polyarylene sulfide, provides a resin composition showing a relatively excellent impact resistance.

SUMMARY OF THE INVENTION

A principal object of the present invention is to provide a polyarylene sulfide resin composition having a further improved impact strength.

According to the present invention, there is provided a polyarylene sulfide resin composition, comprising: 100 wt. parts of polyarylene sulfide and 0.5–50 wt. parts of a graft copolymer; wherein said graft copolymer includes an olefin copolymer segment comprising α-olefin units and α,β-unsaturated acid glycidyl ester units, and a grafting polymer segment comprising α,β-unsaturated acid glycidyl ester units and chemically bonded to the olefin copolymer segment.

These and other objects, features and advantages of the present invention will become more apparent upon a consideration of the following description of the preferred embodiments of the present invention.

DETAILED DESCRIPTION OF THE INVENTION

The resin composition according to the present invention comprises, as a base resin, polyarylene sulfide which herein refers to a polymer comprising structural units each represented by —Ar—S—, wherein Ar denote an arylene group, as a principal constituent preferably constituting at least 70 mol. % thereof. A representative example of the polyarylene sulfide is polyphenylene sulfide comprising structural units each represented by —Ph—S—, wherein Ph denotes a phenylene group. In the present invention, a preferred embodiment of the polyarylene sulfide is a polymer comprising para-phenylene sulfide units in a proportion of at least 70 mol. %, more preferably at least 80 mol. %. If the recurring units are below 70 mol. %, the crystallinity as a characteristic of a crystalline polymer is lowered, thus being liable to fail in providing a sufficient strength and to result in an inferior toughness. It is particularly preferred to use a polyarylene sulfide showing a melt viscosity of 1–2000 Pa.s, more preferably 10–500 Pa.s, as measured under the conditions of a temperature of 310° C. and a shear speed of 1200/sec. Polyarylene sulfide is known to have substantially linear structure free from branching or crosslinkage or a branched or crosslinked structure depending on the production process. In the present invention, the polyarylene sulfide can be any of these types but may preferably be one of a linear structure free from branching so as to exhibit better performances.

The polyarylene sulfide used in the present invention can contain below 30 mol. % of another recurring unit, examples of which may include the following:

metaphenylene sulfide unit:

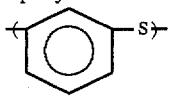

diphenylketone sulfide unit:

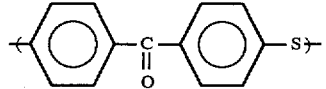

diphenyl sulphone sulfide unit:

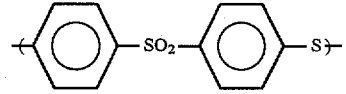

-continued
biphenylene sulfide unit:

diphenyl ether sulfide unit:

2,6-naphthalene sulfide unit:

trifunctional unit:

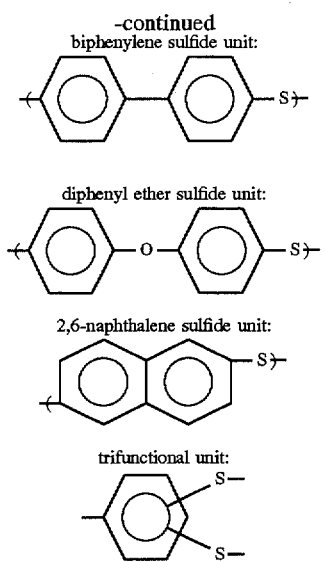

Among the above, it is preferred that the trifunctional unit is not contained in excess of 1 mol. % so as not to lower the crystallinity. As the polyarylene sulfide in the present invention, it is particularly preferred to use para-phenylene sulfide homopolymer having a linear structure or a linear block copolymer comprising 70–95 mol. % of a block of para-phenylene sulfide units and 5–30 mol. % of a block of meta-phenylene sulfide units. The polyarylene sulfide may be prepared through polymerization in a well known manner, followed by post treatments, such as washing with acid, hot water or solvent for de-ionization and impurity removal, adopted as desired.

On the other hand, the graft copolymer as an impact modifier in the resin composition of the present invention includes an olefin copolymer segment comprising α-olefin units and α,β-unsaturated acid glycidyl ester units, and a grafting polymer segment comprising α,β-unsaturated acid glycidyl ester units chemically bonded to the olefin copolymer segment. Hereinafter, the olefin copolymer segment may be sometimes referred to as a segment (A) and the grafting polymer segment comprising α,β-unsaturated acid glycidyl ester units may be sometimes referred to as a segment (B).

Examples of α-olefin providing the α-olefin units of the segment (A) may include: ethylene, propylene and butene-1, and ethylene is particularly preferred. On the other hand, the α,β-unsaturated acid glycidyl ester units constituting the olefin copolymer segment (A) may be represented by the formula of:

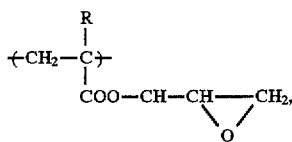

wherein R denotes a hydrogen atom or a lower alkyl group having, e.g., 1–2 carbon atoms. Specific examples of monomers giving the above polymerized units may include: glycidyl acrylate, glycidyl methacrylate and glycidyl ethacrylate, and glycidyl methacrylate is particularly preferred. The olefin copolymer segment giving the segment (A) may be obtained from an α-olefin and an α,β-unsaturated acid as described above through copolymerization according to a well-known manner of radical polymerization.

The α-olefin units may preferably constitute 60–99 wt. %, more preferably 70–98 wt. %, particularly preferably 80–97 wt. %, of the olefin copolymer segment (A). On the other hand, the α,β-unsaturated acid glycidyl ester units, preferably units of glycidyl (meth)acrylate (which herein means acrylate or methacrylate), may preferably constitute 1–40 wt. %, more preferably 2–30 wt. %, particularly preferably 3–20 wt. %, of the olefin copolymer segment (A). If the glycidyl ester unit content is below 1 wt. %, the resultant graft copolymer is liable to show an insufficient impact modifier effect. In excess of 40 wt. %, the resin composition of the present invention is liable to show a lower fluidity in a molten state.

In case where the α,β-unsaturated acid glycidyl ester unit content is below 40 wt. % of the olefin copolymer segment (A), it is possible to further incorporate polymerized units of another comonomer, examples of which may include: (meth)acrylate monomers, such as methyl (meth)acrylate and ethyl (meth)acrylate; vinyl ester monomers, such as vinyl acetate and vinyl propionate; vinyl ether monomers, (meth)acrylonitrile, aromatic vinyl monomers, and carbon monoxide, in en amount providing a total with the α,β-unsaturated acid glycidyl ester units of at most 40 wt. % of the olefin copolymer segment (A).

Examples of the olefin copolymer giving the segment (A) may include: ethylene-glycidyl methacrylate copolymer, ethylene-vinyl acetate-glycidyl methacrylate copolymer, ethylene-ethyl acrylate-glycidyl methacrylate copolymer, ethylene-carbon monoxide-glycidyl methacrylate copolymer, ethylene-glycidyl acrylate copolymer, and ethylene-vinyl acetate-glycidyl acrylate copolymer. Among these, ethylene-glycidyl methacrylate copolymer is particularly preferred. It is possible to use two or more species of the olefin copolymer in mixture.

The olefin copolymer for providing the segment (A) may preferably be used in the form of powder or pellets having an average particle size on the order of 0.1–5 mm. The particle size may preferably be selected appropriately depending on the proportion of the segment (A) in the graft copolymer. Too large a particle size causes a difficulty in dispersion during the polymerization and requires a long time for impregnation of grafting monomer for providing the segment (B).

Examples of the α,β-unsaturated acid glycidyl ester providing the α,β-unsaturated acid glycidyl ester units of the segment (B) may include: glycidyl acrylate, glycidyl methacrylate and glycidyl ethacrylate, of which glycidyl methacrylate is particularly preferred.

The grafting polymer segment (B) can be constituted by polymerized α,β-nnsaturated acid glycidyl ester units alone but may rather preferably be in the form of a copolymer of an α,β-unsaturated acid glycidyl ester and another monoethylenically unsaturated monomer copolymerizable therewith, suitable examples of which may include those polymerized units represented by the following formula (1):

wherein R denotes a hydrogen atom or a lower alkyl group; and X denotes at least one group selected from —COOCH$_3$, —COOC$_2$H$_5$, —COOC$_4$H$_9$, —COOCH$_2$CH(C$_2$H$_5$)C$_4$H$_9$, phenyl, and —CN.

Preferred examples of such a copolymer constituting the grafting polymer segment (B) may include: methyl methacrylate-glycidyl (meth)acrylate copolymer, ethyl acrylate-glycidyl (meth)acrylate copolymer, butyl acrylate-glycidyl (meth)acrylate copolymer, 2-ethylhexyl acrylate-glycidyl (meth)acrylate copolymer, acrylonitrile-glycidyl (meth)acrylate copolymer, acrylonitrile-styrene-glycidyl (meth)acrylate copolymer, butyl acrylate-methyl methacrylate-glycidyl (meth)acrylate copolymer, butyl methacrylate-methyl methacrylate-glycidyl (meth)acrylate copolymer, and styrene-glycidyl (meth)acrylate copolymer.

The grafting polymer segment (B) in the form of such a copolymer may preferably contain 5–50 wt. %, more preferably 7–40 wt. %, particularly preferably 10–35 wt. %, of α,β-unsaturated acid glycidyl ester units.

The graft copolymer used in the present invention comprises the above-mentioned olefin copolymer segment (A) and grafting polymer segment (B) chemically bonded to each other. The chemical bonding form may include branching, crosslinkage and a mixture of these. The presence or absence of such chemical bonding may be judged by whether the graft copolymer can be wholly extracted and separated into the segments (A) and (B) with a solvent capable of dissolving a polymer constituting the segment (A) or (B). If the graft copolymer can be wholly separated into the segments (A) and (B), the segments (A) (B) in the graft copolymer are not chemically bonded. The graft copolymerization and graft copolymer in the present invention refer to a process of providing such chemical bounding and a copolymer product obtained thereby. The graft copolymer may preferably contain 40–95 wt. %, more preferably 50–90 wt. % of the olefin copolymer segment (A). If the segment (A) is below 40 wt. %, the graft copolymer is liable to have an insufficient solubility with polyarylene sulfide and, above 95 wt. %, the resultant resin composition is liable to have inferior heat resistance and size stability. The graft copolymer may preferably contain at least 35 wt. %, more preferably at least 45 wt. %, thereof of the segments (A) and (B) chemically bonded to each other in the above-described sense.

The graft copolymer can be prepared through any known process, such as the chain transfer process or the ionizing radiation irradiation process, but may most preferably be prepared through the following process.

First, 100 wt. parts of an olefin copolymer (A) prepared according to a conventional process is suspended in water. On the other hand, a grafting monomer solution is prepared by dissolving, in 5–400 wt. parts of at least one species of mono-ethylenically unsaturated monomer giving the polymer segment (B), at least one species of radically (co-)polymerizable organic peroxide represented by the following formula (a) or (b) in an amount of 0.1–10 wt. parts per 100 wt. parts of the mono-ethylenically unsaturated monomer, and a radical polymerization initiator having a decomposition temperature for providing a half-life of 10 hours of 40°–90° C. in an amount of 0.01–5 wt. parts per 100 wt. parts of the sum of the mono-ethylenically unsaturated monomer and the radically (co-)polymerizable organic peroxide. The grafting monomer solution is added into the above-prepared aqueous suspension liquid, and the system is heated under a condition that decomposition of the radical polymerization initiator does not substantially occur, thereby to impregnate the olefin copolymer (A) with the grafting monomer solution comprising the mono-ethylenically unsaturated monomer, the radically (co-)polymerizable organic peroxide and the radical polymerization initiator until at least 50 wt. % of the grafting monomer solution impregnates the olefin copolymer (A), and then the system is further elevated in temperature to copolymerize the monoethylenically unsaturated monomer and the radically (co-)polymerizable peroxide together with the olefin copolymer (A), thereby producing a graft copolymer precursor.

Then, the graft copolymer precursor is melt-kneaded at a temperature of 100°–300° C. to obtain the graft copolymer wherein the olefin copolymer segment (A) and the grafting polymer segment (B) are chemically bonded to each other.

The resin composition according to the present invention may be prepared by blending the graft copolymer with polyarylene sulfide. Alternatively, the resin composition according to the present invention may be directly prepared by melt-kneading the graft copolymer precursor together with polyarylene sulfide to form the graft copolymer in situ. The former method is rather preferred.

Formula (a)
(radically (co)-polymerizable organic peroxide)

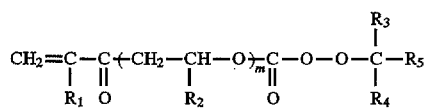

wherein $R_1$ denotes a hydrogen atom or an alkyl group having 1–2 carbon atoms, $R_2$ denotes a hydrogen atom or a methyl group, $R_3$ and $R_4$ independently denote an alkyl group having 1–4 carbon atoms, $R_5$ denotes an alkyl group, phenyl group, alkyl-substituted phenyl group having at most 12 carbon atoms or a cycloalkyl group having 3–12 carbon atoms, and m is 1 or 2.

Formula (b)
(radically (co)-polymerizable organic peroxide)

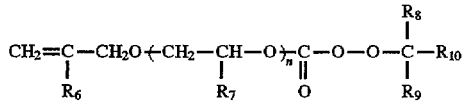

wherein $R_6$ denotes a hydrogen atom or an alkyl group having 1–4 carbon atoms, $R_7$ denotes a hydrogen atom or a methyl group, $R_8$ and $R_9$ independently denote an alkyl group having 1–4 carbon atoms, $R_{10}$ denotes an alkyl group, phenyl group, alkyl-substituted phenyl group having at most 12 carbon atoms or a cycloalkyl group having 3–12 carbon atoms, and n is 0, 1 or 2.

Specific examples of the radically (co-)polymerizable organic peroxide represented by the formula (a) may include: t-butylperoxy(meth)acryloyloxy(ethoxy)ethyl carbonate, t-amylperoxy(meth)acryloyloxy(ethoxy)ethyl carbonate, t-hexylperoxy(meth)acryloyloxy(ethoxy)ethyl carbonate, 1,2,3,3-tetramethylperoxy(meth)acryloyloxy (ethoxy)ethyl carbonate, cumylperoxy(meth)acryloyloxy (ethoxy)ethyl carbonate, p-isopropylperoxy(meth) acryloyloxy(ethoxy)ethyl carbonate, and t-butylperoxyacryloyloxyisopropyl carbonate.

Specific examples of the radically (co-)polymerizable organic peroxide represented by the formula (b) may include: t-butylperoxy(meth)allyl carbonate, cumylperoxy (meth)allyl carbonate, and t-butylperoxy(meth) allyloxyethyl carbonate.

Among the above, particularly preferred are t-butylperoxyacryloyloxyethyl carbonate, t-butylperoxymethacryloyloxyethyl carbonate, t-butylperoxyallyl carbonate, t-butylperoxyallyl carbonate, and t-butylperoxymethacryl carbonate.

More details of the graft copolymer production process are disclosed in U.S. Pat. Nos. 4,877,841, 4,879,347 and 4,839,432, all assigned to Nippon Oil and Fats Co., Ltd. The descriptions of these references are incorporated herein by reference.

The resin composition according to the present invention may be prepared by blending 100 wt. parts of polyarylene sulfide with 0.5–50 wt. parts, preferably 1–20 wt. parts of the graft copolymer. If the graft copolymer is less than 0.5 wt. part, it is impossible to improve the toughness and impact resistance of the resin composition. Too much graft copolymer results in a lowering in heat distortion temperature and impairs the mechanical properties, such as rigidity.

The resin composition according to the present invention may be blended with an inorganic filler. In order to provide a shaped product excellent in mechanical strength, heat resistance, size stability (deformation or warp resistance) and electrical properties, it is preferred to blend the resin composition with an inorganic filler, which may be fibrous, powdery or particulate, or flaky depending on the purpose.

Examples of the fibrous filler may include glass fiber, asbestos fiber, carbon fiber, silica fiber, alumina fiber, zirconia fiber, boron nitride fiber, silicon nitride fiber, boron fiber, potassium titanate fiber, and fibers of metals, such as stainless steel, aluminum, titanium, copper and bronze. Particularly representative fillers are glass fiber and carbon fiber.

Examples of powdery or particulate filler may include: carbon black, glass beads, glass powder; and powders of silica, quartz, silicates, such as calcium silicate, aluminum silicate, kaolin, talc, clay, diatomaceous earth and wallastonite; metal oxides, such as iron oxide, titanium oxide, zinc oxide and alumina; metal carbonates, such as calcium carbonate and magnesium carbonate; metal sulfates, such as calcium sulfate and barium sulfate; silicon carbide, silicon nitride, boron nitride, and various metals. Further, flaky fillers may include: mica, glass flake and various metal foils.

These inorganic fillers may be used singly or in combination of two or more species. A combination of a fibrous filler, particularly glass fiber or carbon fiber, and a particulate and/or a flaky filler, is particularly preferred to provide a shaped product having good mechanical strength, size accuracy and electrical properties in combination.

When such a filler is added, it is sometimes desirable to use a binder or a surface treating agent, as desired. Examples thereof may include: functional compounds, such as epoxy compounds, isocyanate compounds, silane compounds and titanate compounds. These compounds may be applied as a surface treating agent or a binder to the filler, or can be added to the resin composition simultaneously with the filler.

When an inorganic filler is used, the filler may be added in an amount of at most 400 wt. parts, preferably 10–300 wt. parts, per 100 wt. parts of polyarylene sulfide. Below 10 wt. parts, the effect of addition is scarce to result in a somewhat inferior mechanical strength. Above 400 wt. parts, the shaping or molding of the product becomes difficult, and the resultant shaped product is liable to have rather inferior mechanical strength.

In the shaping or molding of the resin composition according to the present invention, it is also possible to incorporate another thermally stable resin, examples of which may include: polyolefins, aromatic polyesters formed from an aromatic dicarboxylic acid and a diol or oxycarboxylic acid, such as polyethylene terephthalate and polybutylene terephthalate, polyamide, polycarbonate, ABS, polyphenylene oxide, polyalkyl acrylate, polyacetal, polysulfone, polyether sulfone, polyether imide, polyether ketone, and fluorine-containing resin. Such other resin may be powdery, particulate or fibrous, and two or more species thereof can be added in mixture.

To the resin composition according to the present invention, it is also possible to add various additive materials generally added to thermoplastic resins and thermosetting resins, including, for example: stabilizers, such as an antioxidant, and an ultraviolet absorber, an antistatic agent, a flame retardant, colorants such as dye and pigment, a lubricant, a crystallization promoter, and a crystal nucleating agent, as desired, depending on the required properties.

The resin composition according to the present invention may be prepared by using an apparatus and a method generally used for preparation of synthetic resin compositions. For example, the above-mentioned components may be blended and melt-kneaded through a single screw or twin screw extruder to be extruded into pellets for molding; a part of the components is formulated into a master batch for blending and molding; all or a part of the resin components are pulverized for facilitating dispersion and mixing, followed by blending and melt-extrusion, etc. Any method may be adopted.

The present invention will be described more specifically with reference to Examples and Comparative Examples.

In Examples, resin compositions prepared were evaluated with respect to the following items in the following manners.

<Izod Impact Strength>

A test piece was prepared and an Izod impact strength was measured from its notch side according to ASTM D-256, Method A, by using an apparatus ("UF IMPACT MASTER", available from Ueshima Seisakusho K.K.).

<Tensile Test>

Test piece were prepared, and tensile strength and tensile elongation were measured according to ASTM D-638.

EXAMPLE 1

(Preparation of Graft Copolymer)

Into a 5 liter-stainless steel-made autoclave, 2500 g of pure water was charged, and 2.5 g of polyvinyl alcohol was dissolved therein as a suspension aid. To the system, 700 g of ethylene-glycidyl methacrylate copolymer (in a pellet form containing 15 wt. % of glycidyl methacrylate, available from Nippon Sekiyu Kagaku K.K.) was added and stirred for dispersion. Separately, 1.5 g of benzoyl peroxide (radical polymerization initiator) (trade name "Niber-B", available from Nippon Yushi K.K.), $t_{10h}$ (ten hour half-life temperature)=74° C.) and 6 g of t-butylperoxymethacryloyloxyethyl carbonate (radically (co-)polymerizable organic peroxide), were dissolved in 60 g of methyl acrylate, 141 g of butyl acrylate and 99 g of glycidyl methacrylate to prepare a grafting monomer solution, which was then charged into the autoclave, followed by stirring.

Then, the mixture in the autoclave was elevated in temperature to 60°–65° C. and stirred for 2 hours to impregnate the ethylene-glycidyl methacrylate copolymer with the grafting monomer solution. Then, the system temperature was raised to 80°–85° C. and held thereat for 7 hours to complete the polymerization, followed by washing with water and drying to obtain a graft copolymer precursor. The graft copolymer precursor was further melt-kneaded and extruded through an extruder at 200° C. to form a graft copolymer in a pellet form. In the graft copolymer, ca. 60 wt. % of the segments (A) and (B) were found to be chemically bonded to each other.

(Preparation of Resin Composition)

90 wt. parts of polyphenylene sulfide (trade name "Fortron KPS", available from Kureha Kagaku Kogyo K.K.) and 10 wt. parts of the above-prepared graft copolymer were preliminarily blended for 5 min. by a Henschel mixer to obtain a preliminary blend (resin composition). The blend was extruded through an extruder having a cylinder temperature of 310° C. to form pellets of polyphenylene sulfide resin composition. The pellets were molded into ASTM test pieces by an injection molding machine under a cylinder temperature of 320° C. and a mold temperature of 150° C.

The results of the evaluation are shown in Table 1 together with the resin composition.

EXAMPLE 2

A graft copolymer was prepared in the same manner as in Example 1 except for replacing 700 g of the ethylene-glycidyl methacrylate copolymer in Example 1 with 659 g of the same copolymer, and replacing 60 g of methyl acrylate, 141 g of butyl acrylate and 99 g of glycidyl methacrylate in Example 1 with 58.34 g styrene, 24.47 g of acrylonitrile and 11.29 g of glycidyl methacrylate. Then, 10 wt. parts of the graft copolymer and 90 wt. parts of the same polyphenylene sulfide as in Example 1 were blended to formulate a resin composition, which was evaluated in the same manner as in Example 1.

The results together with the resin composition are also shown in Table 1.

COMPARATIVE EXAMPLES 1–3

Graft copolymers were prepared in the same manner as in Example 1 except for using the ethylene-glycidyl methacrylate copolymers and the grafting monomer mixtures as shown in Table 1. In Comparative Example 3, the ethylene-glycidyl methacrylate copolymer (glycidyl methacrylate content=15wt. %) used in Example 1 was replaced by ethylene-glycidyl methacrylate copolymer (glycidyl methacrylate content=20 wt. %, in pellet form, available from Nippon Sekiyu Kagaku K.K.).

From the graft copolymers, the resin compositions were prepared and evaluated otherwise in the same manner as Example 1. The results are also shown in Table 1.

EXAMPLE 3

50 wt. parts of the polyphenylene sulfide and 10 wt. parts of the graft copolymer prepared in Example 1 were preliminary blended similarly as in Example 1, and then 40 wt. parts of commercially available glass fiber (diameter=13 μm and length=3 mm) was further blended therewith in the Henschel mixer for 2 minutes to obtain a preliminary blend (resin composition). The preliminary blend was then extruded, molded into test pieces and evaluated in the same manner as in Example 1. The results are also shown in Table 1.

EXAMPLE 4 AND COMPARATIVE EXAMPLES 4 AND 5

Resin compositions containing glass fiber prepared and evaluated in the same manner as in Example 3 except that the graft copolymer prepared in Example 1 was replaced by the graft copolymers prepared in Example 2 (Example 4) and Comparative Examples 1 and 2 (Comparative Examples 4 and 5), respectively. The results are also shown in Table 1.

In view of the results shown in Table 1, the resin compositions including graft copolymers containing glycidyl ester units in the grafting polymer segments (Examples) show better impact strengths than the corresponding resin compositions including graft copolymers containing no glycidyl ester units in the grafting polymer segments (Comparative Examples). It is particularly noted that the graft copolymers of Example 2 and Comparative Example 3 contained the same amount (14 wt. parts) of the glycidyl methacrylate units (per 100 wt. parts of the graft copolymer) but the graft copolymer of Example 2 containing the glycidyl methacrylate units in the grafting polymer segments provided a resin composition showing a higher impact strength.

As described above, according to the present invention, a polyarylene sulfide resin composition having a further improved impact strength is provided.

TABLE 1

| Components*[1], *[2] | Example | | Comparative Example | | | Example | | Comparative Example | |
| --- | --- | --- | --- | --- | --- | --- | --- | --- | --- |
| | 1 | 2 | 1 | 2 | 3 | 3 | 4 | 4 | 5 |
| PPS | 90 | 90 | 90 | 90 | 90 | 50 | 50 | 50 | 50 |
| glass fiber (D = 13 μm, L = 3 mm) | | | | | | 40 | 40 | 40 | 40 |
| (E/GMA = 85/15)$_{70}$//(MA/BA/GMA = 20/47/33)$_{30}$ | 10 | | | | | 10 | | | |
| (E/GMA = 85/15)$_{65.9}$//(ST/AN/GMA = 62/26/12)$_{34.1}$ | | 10 | | | | | 10 | | |
| (E/GMA = 85/15)$_{70}$//(MA/BA = 30/70)$_{30}$ | | | 10 | | | | | 10 | |
| (E/GMA = 85/15)$_{70}$//(ST/NA = 70/30)$_{30}$ | | | | 10 | | | | | 10 |
| (E/GMA/80/20)$_{70}$//(ST/AN = 70/30)$_{30}$ | | | | | 10 | | | | |
| Properties | | | | | | | | | |
| Izot insect strength (J/m) | 118 | 400 | 81 | 135 | 350 | 145 | 149 | 120 | 126 |
| Tensile strength (MPa) | 59.0 | 64.4 | 61.8 | 64.6 | 65.1 | 135 | 133 | 128 | 128 |
| Tensile elongation (%) | 10.3 | 9.9 | 10.5 | 7.4 | 8.4 | 6.0 | 6.1 | 6.3 | 5.4 |

*[1]The numbers representing the amounts of components in a composition are all wt. parts (=wt. %).
*[2]Simplified expressions for graft copolymers in Table 1 represent the following:
(E/GMA = 85/15)$_{70}$ // (MA/BA/GMA = 20/47/33)$_{30}$ represents a graft copolymer comprising 70 wt. parts of ethylene-glycidyl methacrylate (85:15 by weight) copolymer segment and 30 wt. parts of grafting methyl acrylate/butyl acrylate/glycidyl methacrylate (20/47/33 by weight) copolymer segment (used in Examples 1 and 3).
(E/GMA = 85/15)$_{65.9}$ // (ST/AN/GMA = 62/26/12)$_{34.1}$ represents a graft copolymer comprising 65.9 wt. parts of ethylene-glycidyl methacrylate (85:15 by weight) copolymer and 34.1 wt. parts of grafting styrene/acrylonitrile/glycidyl methacrylate (62/26/12 by weight) copolymer segment (used in Examples 2 and 4).
(E/GMA = 85/15)$_{70}$ // (MA/BA = 30/70)$_{30}$ represents a graft copolymer comprising 70 wt. parts of ethylene-glycidyl methacrylate (85:15 by weight) copolymer segment and 30 wt. parts of grafting methyl acrylate/butyl acrylate (30/70 by weight) copolymer segment (used in Comparative Examples 1 and 4).
(E/GMA = 85/15)$_{70}$ // (ST/AN = 70/30)$_{30}$ represents a graft copolymer comprising 70 wt. parts of ethylene-glycidyl methacrylate (85:15 by weight) copolymer segment and 30 wt. parts of grafting styrene/acrylonitrile (70/30 by weight) copolymer segment (used in Comparative Examples 2 and 5).
(E/GMA = 80/20)$_{70}$ // (ST/AN = 70/30)30 represents a graft copolymer comprising 70 wt. parts of ethylene/glycidyl methacrylate (80:20 by weight) copolymer segment and 30 wt. parts of grafting styrene/acrylonitrile (70/30 by weight) copolymer segment (used in Comparative Example 3).

What is claimed is:

1. A polyarylene sulfide resin composition, comprising 100 wt. parts of polyarylene sulfide and 1–20 wt. parts of a graft copolymer;

wherein said graft copolymer includes an olefin copolymer segment comprising α-olefin units and α,β-unsaturated acid glycidyl ester units, and a grafting polymer segment chemically bonded to the olefin copolymer segment; and wherein said grafting polymer segment is in the form of a copolymer comprising 5–50 wt. % of α,β-unsaturated acid glycidyl ester units and 50–95 wt. % of units of a monoethylenically unsaturated monomer.

2. A resin composition according to claim 1, wherein said grafting polymer segment comprises 10–35 wt. % of the α,β-unsaturated acid glycidyl ester units and 65–90 wt. % of units of the monoethylenically unsaturated monomer.

3. A resin composition according to claim 2, wherein said monoethylenically unsaturated monomer comprises at least one monomer providing polymerized units each represented by the following formula (1):

(1)

wherein R denotes a hydrogen atom or a lower alkyl group; and X denotes at least one group selected from —COOCH$_3$, —COOC$_2$H$_5$, —COOC$_4$H$_9$, —COOCH$_2$CH(C$_2$H$_5$)C$_4$H$_9$, phenyl, and —CN.

4. A resin composition according to claim 1, wherein said grafting polymer segment comprises 7–40 wt. % of the α,β-unsaturated acid glycidyl ester units and 60–93 wt. % of units of the monoethylenically unsaturated monomer.

5. A resin composition according to claim 1, wherein said polyarylene sulfide is poly para-phenylene sulfide comprising at least 70 wt. % of para-phenylene sulfide units.

6. A resin composition according to claim 1, wherein said α-olefin is ethylene.

7. A resin composition according to claim 1, wherein at least 35 wt. % of said graft copolymer comprises the olefin copolymer segment and the grafting polymer segment chemically bonded to each other.

8. A resin composition according to claim 1, wherein said olefin copolymer segment comprises 60–99 wt. % of the α-olefin units and 1–40 wt. % of said α,β-unsaturated acid glycidyl ester units.

9. A resin composition according to claim 1, further containing at most 400 wt. parts of an inorganic filler per 100 wt. parts of the polyarylene sulfide.

10. A resin composition according to claim 1, wherein said α,β-unsaturated acid glycidyl ester units in the olefin copolymer segment and said α,β-unsaturated acid glycidyl ester in the grafting polymer segment are identical in species.

11. A resin composition according to claim 1, wherein said α,β-unsaturated acid glycidyl ester units in the olefin copolymer segment end said α, β-unsaturated acid glycidyl ester in the grafting polymer segment are different in species.

12. A resin composition according to claim 1, wherein said α,β-unsaturated acid glycidyl ester units in the olefin copolymer segment comprise units of at least one member selected from the group consisting of glycidyl acrylate and glycidyl methacrylate.

13. A resin composition according to claim 1, wherein said α,β-unsaturated acid glycidyl ester units in the grafting polymer segment comprise units of at least one member selected from the group consisting of glycidyl acrylate and glycidyl methacrylate.

14. A resin composition according to claim 12, wherein said α,β-unsaturated acid glycidyl ester units in the olefin copolymer segment and the grafting polymer segment respectively comprise glycidyl methacrylate.

* * * * *